US009144105B2

(12) United States Patent
Chao et al.

(10) Patent No.: US 9,144,105 B2
(45) Date of Patent: Sep. 22, 2015

(54) DEACTIVATION METHOD OF MULTIMEDIA BROADCAST MULTICAST SERVICE AND RELATED DEVICE

(75) Inventors: Hua Chao, Shanghai (CN); Xin Xu, Shanghai (CN); Zongchuang Liang, Shanghai (CN); Yonggang Wang, Shanghai (CN); He Wang, Shanghai (CN); Nan Wang, Shanghai (CN); Yu Chen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1188 days.

(21) Appl. No.: 11/213,836

(22) Filed: Aug. 30, 2005

(65) Prior Publication Data

US 2006/0056396 A1    Mar. 16, 2006

(30) Foreign Application Priority Data

Sep. 10, 2004    (CN) .......................... 2004 1 0066292

(51) Int. Cl.
*H04J 3/26* (2006.01)
*H04Q 7/00* (2006.01)
(Continued)

(52) U.S. Cl.
CPC .............. *H04W 76/062* (2013.01); *H04W 4/06* (2013.01)

(58) Field of Classification Search
USPC ......... 370/310, 259–271, 312, 328, 432, 338; 455/425, 414.1
See application file for complete search history.

(56) References Cited

U.S. PATENT DOCUMENTS 7,349,703 B2 *    3/2008    Yi et al. ...................... 455/452.2
7,493,108 B2 *    2/2009    Beming et al. ................ 455/418
(Continued)

FOREIGN PATENT DOCUMENTS

CN    1486005    3/2004
CN    1489314    4/2004
(Continued)

OTHER PUBLICATIONS

ETSI EN 301 344 V7.4.1 (Sep. 2000) European Standard (Telecommunications series) Digital cellular telecommunications system (Phase 2+); General Packet Radio Service (GPRS); Service description; Stage 2 (GSM 03.60 version 7.4.1 Release 1998) pp. 66-68.*
(Continued)

*Primary Examiner* — Wutchung Chu
(74) *Attorney, Agent, or Firm* — Fay Sharpe LLP

(57) ABSTRACT

The present invention provides a deactivation method of multimedia broadcast multicast service for wireless communication system, comprising steps of: in SGSN, completing the context deactivation of user equipment of broadcast multicast service; in the user equipment, completing the context deactivation of user equipment of multimedia broadcast multicast service; in GGSN, completing the context deactivation of user equipment of multimedia broadcast multicast service; characterized by further comprising steps of: in SGSN, after completing the context deactivation of user equipment of multimedia broadcast multicast service, completing the context deactivation of user equipment of multimedia broadcast multicast service in a radio network controller of a radio access network. According to the method of the present invention, the context of user equipment of multimedia broadcast multicast service in the radio network controller is deleted, so that the waste of radio resources is prevented, the hidden troubles induced by the inconsistency of data among the network elements is removed, and a foundation for the correct realization of future products is laid.

5 Claims, 3 Drawing Sheets

(51) Int. Cl.
*G06F 19/00* (2011.01)
*H04W 76/06* (2009.01)
*H04W 4/06* (2009.01)

(56) References Cited

U.S. PATENT DOCUMENTS

| | | | |
|---|---|---|---|
| 7,606,226 B2* | 10/2009 | Yi et al. | 370/390 |
| 7,869,399 B2* | 1/2011 | Terry | 370/329 |
| 2002/0087701 A1* | 7/2002 | Siikaniemi | 709/227 |
| 2004/0085926 A1* | 5/2004 | Hwang et al. | 370/328 |
| 2004/0156338 A1 | 8/2004 | Pasanen | |
| 2004/0185837 A1* | 9/2004 | Kim et al. | 455/414.3 |
| 2005/0105544 A1* | 5/2005 | Pirskanen et al. | 370/432 |
| 2006/0140159 A1* | 6/2006 | Choi et al. | 370/336 |
| 2006/0154627 A1* | 7/2006 | Wang et al. | 455/130 |
| 2006/0156370 A1* | 7/2006 | Parantainen | 725/132 |
| 2007/0086443 A1* | 4/2007 | Zhang et al. | 370/352 |
| 2007/0105557 A1* | 5/2007 | Israelsson et al. | 455/436 |
| 2007/0275742 A1* | 11/2007 | Zhang | 455/466 |
| 2007/0293249 A1* | 12/2007 | Wang | 455/466 |

FOREIGN PATENT DOCUMENTS

| | | |
|---|---|---|
| CN | 1549619 A | 11/2004 |
| EP | 1 318 684 A1 | 6/2003 |
| WO | WO 00/76243 A1 | 12/2000 |

OTHER PUBLICATIONS

3GPP TR 29.846 v1.5.0 (Jun. 2004) Technical Report, "3rd Generation Partnership Project: Technical Specification Group Core Networks: Multimedia Broadcast / Multicast Service (MBMS); CN1 proceedure description (Release 6)".*

3GPP TR 24.007 v5.2.0 (Jun. 2004) Technical Report, "3rd Generation Partnership Project: Technical Specification Group Core Network: Mobile radio interface signalling layer 3; General aspects (Release 5)".*

3GPP TSG-SA2 Meeting #43, R2-041505, Montreal, Canada, Aug. 16-20, 2004.

* cited by examiner

DEACTIVATION METHOD OF MULTIMEDIA BROADCAST MULTICAST SERVICE AND RELATED DEVICE

CROSS-REFERENCE TO RELATED APPLICATION(S)

This application is based on the Chinese Patent Application No. 200410066292.5 filed on Sep. 10, 2004, the disclosure of which is hereby incorporated by reference thereto in its entirety, and the priority of which is hereby claimed under 35 U.S.C. §119.

FIELD OF THE INVENTION

The present invention relates to a wideband code division multiple access (WCDMA) communication system, and more particularly, to a multimedia broadcast multicast services (MBMS) procedure in a WCDMA communication system.

BACKGROUND OF THE INVENTION

MBMS is a point-to-multipoint service carrying capacity introduced by 3GPP in Release 6. Through network resource sharing, including core network and access network resource sharing, air interface resource sharing in particular, MBMS achieves transmission of point-to-multipoint service in which data is transmitted from a single data source to multiple users, so as to enhance the utilization rate of network bandwidth, especially that of air interface resources. MBMS defined by 3GPP can achieve not only multicast and broadcast of the message type in text and at a low rate but also multicast and broadcast of multimedia services at a high rate. Undoubtedly, this conforms to the trend of the development of mobile data in future.

FIG. 1 is an architectural schematic view of WCDMA communication systems providing MBMS. As shown in FIG. 1, the WCDMA MBMS network architecture realizes sharing of air interface resources based on a WCDMA/GPRS packet network and through incorporating into core network 1 new function entities, e.g. broadcast multicast service center (BM-SC) 105, adding the MBMS function to existing packet domain function entities, such as UE 101, a radio network controller (RNC not shown) located inside radio access network (RAN) 102, serving GPRS support node (SGSN) 103 and gateway GPRS support node (GGSN) 104, and defining new logic shared channels. The BM-SC 105, which is connected with multicast broadcast source 106 in public data network 2, is used for authorizing and initiating MBMS services in a mobile network and controlling the transfer of MBMS contents; the SGSN 103 and the GGSN 104, which are located in the core network 1, form a transmission network within the core network in MBMS systems to provide routing for the transfer of packet data, in which the SGSN 103 performs network control for users and the GGSN 104 establishes or releases user interface carrying for the transfer of MBMS service data; and the RAN 102 provides radio resources for MBMS services via an air interface and is responsible for the valid distribution of MBMS service data to service areas of MBMS services.

To support such a new capacity introduced into 3GPP Release 6, there is a need to define in the WCDMA network a series of MBMS service procedures, which are as follows:
MBMS Multicast Service Activation Procedure;
MBMS Session Start Procedure;
MBMS Registration Procedure;
MBMS Session Stop Procedure;
MBMS De-Registration Procedure;
MBMS Multicast Service Deactivation Procedure;
MBMS Broadcast Service Activation;
MBMS Broadcast Service De-Activation Procedure;
MBMS Broadcast Session Start Procedure.

Among them, the MBMS Multicast Service Deactivation Procedure defines signaling interaction and operation to be implemented between the UE 101 and a network when the user equipment UE 101 wishes to cancel a certain activated multicast service. Usually initiated by the UE 101, this procedure aims to remind the network that the UE 101 does not desire data service of the certain MBMS service. Through this deactivation procedure, UE context corresponding to the MBMS service (hereinafter referred to as MBMS UE context) stored in both the UE 101 and the network is deleted. The context is directly related to accurate distribution and transmission of MBMS data.

FIG. 2 is a schematic view of the prior MBMS Multicast Service Deactivation procedure. For the detailed description of the prior MBMS Multicast Service Deactivation procedure, please see 3GPP protocol (TS 23.246 V6.3.0 2004-06). The procedure illustrated in FIG. 2 takes into consideration only the removal of MBMS UE context in the UE 101, the SGSN 103 and the GGSN 104 and does not consider the removal of MBMS UE context stored in the RNC. After the MBMS Multicast Service Deactivation procedure, information on the multicast service which the UE 101 wishes to cancel is no longer on either the UE side or the core network side. That is to say, after the procedure, there will be no other trigger condition for the removal of corresponding MBMS UE Context from the RNC. Then, after the procedure in which the UE 101 cancels a certain multicast service, the corresponding MBMS UE Context is still retained in the RNC. This might result in the fact that, in the subsequent distribution procedure of the MBMS Multicast Service data, even though the UE 101 has performed deactivation on a certain MBMS service and there is no other UE that has subscribed to this MBMS service in the cell where UE 101 is located, the RNC still allots it system resources and sends corresponding service data to the cell where the UE 101 is located. Such a result not only deviates from the object of cancellation of the MBMS service the UE 101 wishes to achieve through the deactivation procedure, but also is a waste of radio resources. Moreover, MBMS UE Context stored in each network element (UE, RNC, SGSN, GGSN) is inconsistent, while the RNC will keep the information which is virtually worthless, hence a waste of the RNC's storage space. Consequently, this might lead to hidden troubles and impair correct implementation of future products.

SUMMARY OF THE INVENTION

Therefore, it is an object of the present invention to solve the technical problems that the prior MBMS Deactivation procedure causes waste of radio resources and inconstancy of data between relevant network elements which leads to hidden troubles.

To this end, the present invention provides a deactivation method of multimedia broadcast multicast service for wireless communication system, comprising steps of:
in SGSN, completing the context deactivation of user equipment of multimedia broadcast multicast service;
in the user equipment, completing the context deactivation of user equipment of multimedia broadcast multicast service;
in GGSN, completing the context deactivation of user equipment of multimedia broadcast multicast service;

characterized by further comprising a step of:

after SGSN completes the context deactivation of user equipment of multimedia broadcast multicast service, completing context deactivation of user equipment of multimedia broadcast multicast service in a radio network controller of a radio access network.

The present invention further provides a deactivation method of multimedia broadcast multicast service for wireless communication system, characterized by comprising a step of:

in a special condition, the radio network controller of the radio access network is triggered by the Serving GPRS Support Node to perform the context deactivation of user equipment of multimedia broadcast multicast service.

The present invention further provides a Serving GPRS Support Node, capable of supporting the multimedia broadcast multicast service in wireless communication system, characterized by comprising:

means for requesting to de-link a user equipment of multimedia broadcast multicast service, for transmitting a de-link request message for user equipment of multimedia broadcast multicast service to a radio network controller of a radio access network, after said Serving GPRS Support Node completes context deactivation of user equipment of multimedia broadcast multicast service, so as to request that context deactivation of user equipment of multimedia broadcast multicast service be completed in said radio network controller, and for transmitting a de-link request message for user equipment of multimedia broadcast multicast service to said radio network controller, when an error occurs in processing of said multimedia broadcast multicast service by said wireless communication system, so as to request that context deactivation of user equipment of multimedia broadcast multicast service be completed in said radio network controller.

The present invention further provides a wireless network controller, capable of supporting multimedia broadcast multicast service in wireless communication network, characterized by comprising:

means for responding to de-link a user equipment of multimedia broadcast multicast service, for instructing that context deactivation of user equipment of multimedia broadcast multicast be completed in said radio network controller, when a de-link request message for user equipment of multimedia broadcast multicast service is received from a Serving GPRS Support Node, and for transmitting a de-link response message for user equipment of multimedia broadcast multicast service to said Serving GPRS Support Node afterward, so as to report whether processing of context deactivation of user equipment of multimedia broadcast multicast service is successful or not in said radio network controller.

According to the deactivation method of multimedia broadcast multicast service of the present invention, not only MBMS UE Context in UE, SGSN and GGSN but also MBMS UE Context in RNC is deleted, so that the waste of wireless resource is avoided, the hidden troubles induced by the inconsistency of data among the network elements is removed, and a foundation for correct realization of future products is laid.

Other features and advantages of the present invention will become more apparent after reading the detailed description of embodiments of the present invention, taken in conjunction with the accompanying drawings.

DESCRIPTION OF THE PREFERRED EMBODIMENTS

Hereinafter, the embodiment of the present invention will be described in detail with reference to the accompanying drawings.

Figure 1:
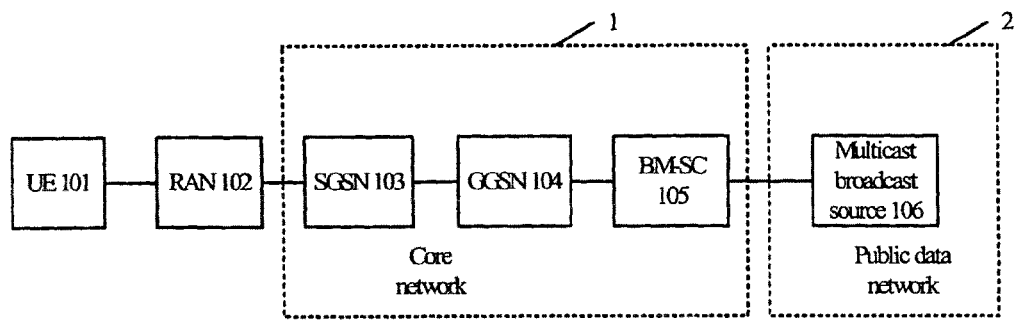
FIG. 1 an architectural schematic view of WCDMA communication systems providing MBMS.
Figure 2:
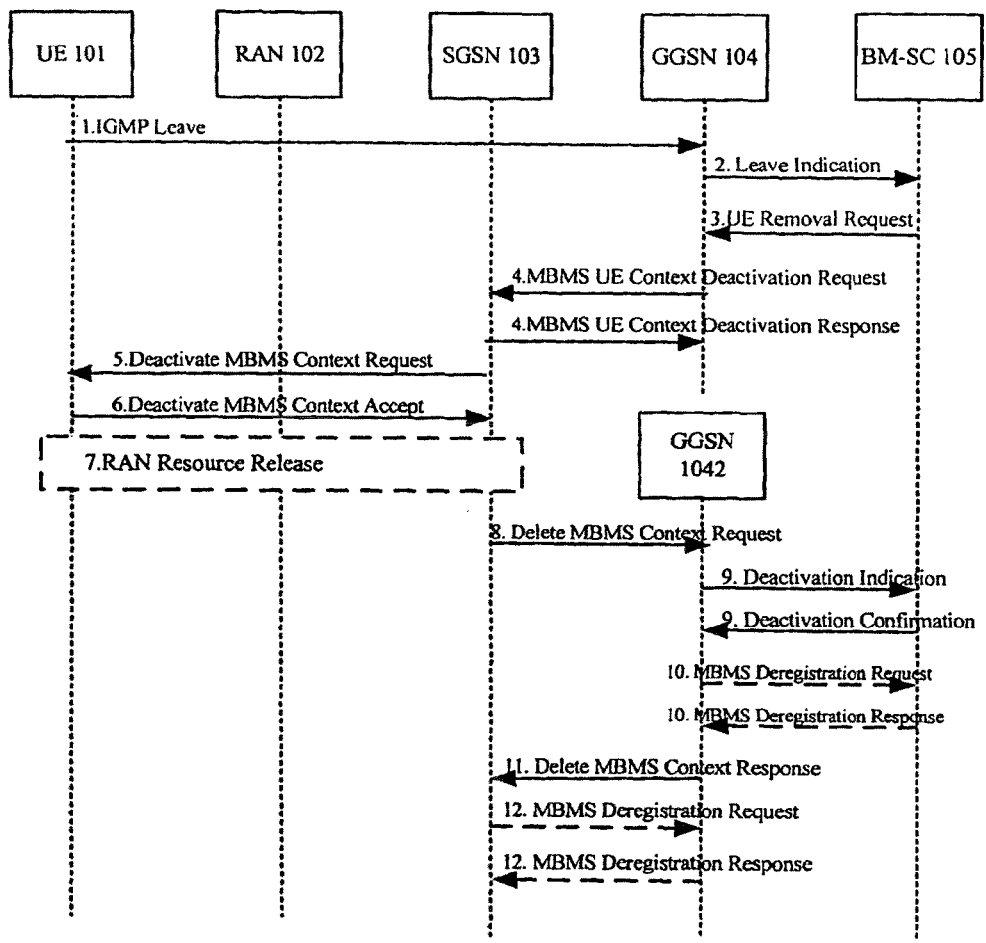
FIG. 2 is a schematic view of the prior MBMS Multicast Service Deactivation procedure.

FIGS. 1 and 2 have been described above.

Figure 3:
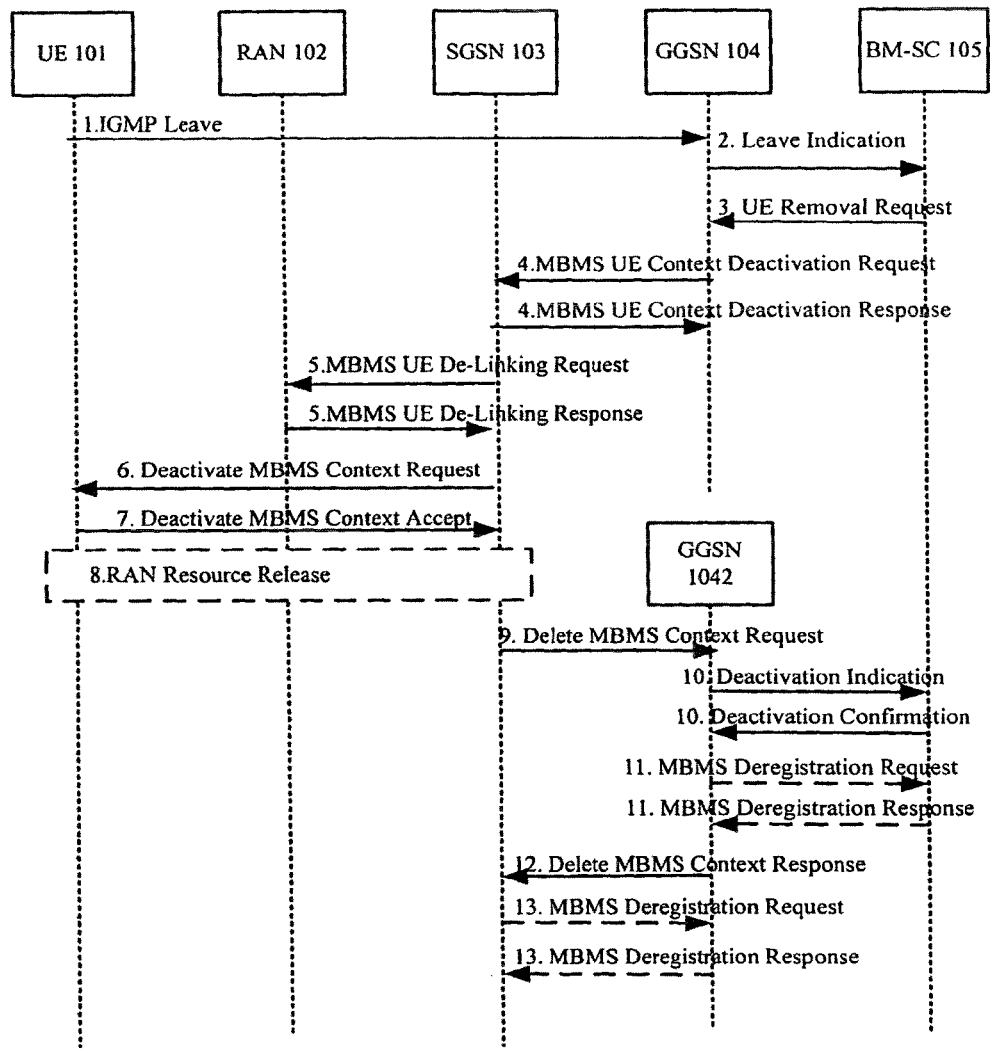
FIG. 3 is a schematic view of MBMS Multicast Service Deactivation procedure according to the present invention.

FIG. 3 is a schematic view of MBMS Multicast Service Deactivation procedure according to the present invention.

As shown in FIG. 3, the UE 101 sends an IPv4-based IGMP or IPv6-based MLD Leave message over the default service request and packet data protocol (PDP) message to leave a particular multicast service identified by an IP multicast address.

In step 2, the GGSN 104 sends a Leave Indication message, including IP multicast address and international mobile user subscriber identifier (IMSI) etc., to the BM-SC 105, indicating that the UE 101 is requesting to leave the multicast service identified by the IP multicast address.

In step 3, upon reception of the Leave Indication message, the BM-SC 105 verifies whether the IP multicast address corresponds to a valid MBMS bearer service and sends a UE Removal Request message, including the IP multicast address, access point name (APN) and IMSI parameters etc., to the GGSN 104 that originated the Leave Indication message. The APN shall be the same as that provided by the BM-SC 105 when the UE 101 activated the multicast service. In addition, for service-specific reasons, for example, when the multicast service is terminated but the UE 101 has not yet left the multicast group which the multicast service belongs to, the BM-SC 105 may also initiate the deactivation of an MBMS UE Context by directly sending a UE Removal message to the GGSN 104.

In step 4, upon reception of the UE Removal Request message, the GGSN 104 sends an MBMS UE Context Deactivation Request message to the SGSN 103. The IP multicast address, APN and IMSI, which are carried by the message, jointly identify the MBMS UE Context to be deleted by the SGSN 103. The APN is the one received in step 3. The SGSN 103 responds to the received MBMS UE Context Deactivation Request by sending an MBMS UE Context Deactivation Response message to the GGSN 104. In addition, the GGSN 104 may also sends an MBMS UE Context Deactivation Request message to the SGSN 103 for other reasons, e.g. when an error occurs.

In step 5, the removal of the MBMS UE Context in the RNC in the RAN 102 is accomplished. In step 5, the removal of the MBMS UE Context is effectuated by adopting the "MBMS UE De-link" signaling procedure defined in 3GPP. This signaling procedure is implemented by an "MBMS UE De-link Request message" and an "MBMS UE De-link Response message". Step 5 follows the principle of deleting information from up to down in a distribution tree, i.e. first deleting the corresponding information of a node in a network and then deleting the corresponding information of a downstream node of that node. Thus, the "MBMS UE De-link"

signaling procedure is performed after the SGSN 103 has completed the "MBMS UE Context Deactivation" procedure (i.e. step 4).

Specifically, in step 5, upon reception of the MBMS UE Context Deactivation Request message, the SGSN 103 sends an MBMS UE De-link Request message, including IP multicast address, APN and IMSI parameters etc., to the RAN 102. The RAN 102 deletes the MBMS UE Context stored in the RNC and sends an MBMS UE Context Deactivation Response message, including IP multicast address, APN and IMSI parameters etc., to the SGSN 103, so as to report to the SGSN 103 whether the RNC has successfully deleted the MBMS UE Context on the RNC side in the RAN 102. In addition, the SGSN 103 may also send an MBMS UE De-link Request message to the RAN 102 for other reasons, such as when an error occurs.

Step 5 described above constitutes the principal technical difference between FIG. 3 and FIG. 2.

In step 6, upon reception of the MBMS UE Context Deactivation Request message, the SGSN 103 sends a Deactivate MBMS UE Context Request message to the UE 101. The Deactivate MBMS UE Context Request message carries parameters used for identifying the MBMS UE Context to be deleted by the UE 101. In addition, the SGSN 103 may also send a Deactivate MBMS UE Context Request message to the UE 101 for other reasons, e.g. due to a change in the roaming restrictions for the user.

In step 7, the UE 101 deletes the MBMS UE Context according to the received request message and sends a Deactivate MBMS UE Context Accept message to the SGSN 103.

If the current dedicated radio resources have been allocated to the UE 101 for reception of the MBMS data, then the RAN 102 releases these radio resources in step 8. If the current shared radio resources have been assigned for sending the MBMS data, then the RAN 102 might transfer the remaining UE to dedicated resources. Step 8 is marked up by a dashed-line block in FIG. 3.

In step 9, upon reception of the Deactive MBMS UE Context Accept message, the SGSN 103 sends a Delete MBMS Context Request message to the GGSN 1042 that holds the MBMS UE Context. This GGSN 1042 may be different from the GGSN 104 that receives IGMP Leave message in step 1. In addition, the SGSN 103 may also send a Delete MBMS Context Request message to the GGSN 1042 for other reasons, e.g. due to missing periodic updates.

In step 10, the GGSN 1042 deletes the MBMS UE Context according to the request message received and sends a Deactivation Indication message to the BM-SC 105 to confirm the successful deactivation of the MBMS UE Context. The BM-SC 105, after receiving the Deactivation Indication message, deletes the MBMS UE Context and sends a deactivation confirmation message to the GGSN 1042.

In step 11, if the GGSN 1042 determines that no other UE uses or expectes to use the MBMS bearer service and the list of downstream nodes in the corresponding MBMS Bearer Context is empty, the GGSN 1042 sends an MBMS De-Registration Request message to the BM-SC 105. The BM-SC 105 responds with an MBMS De-Registration Response message and removes the identifier of the GGSN 1042 from the list of downstream nodes parameter in its MBMS Bearer Context. Step 11 is marked up by a dashed-line arrowhead in FIG. 3.

In step 12, the GGSN 1042 acknowledges the deactivation of the MBMS UE Context by sending a Delete MBMS Context Response message to the SGSN 103. SGSN 103 deletes the MBMS UE Context after receiving the Delete MBMS Context Response message.

In step 13, if the SGSN 103 determines that there is no other UE using or expecting to use this MBMS bearer service and the list of downstream nodes in the corresponding MBMS Bearer Context is empty, the SGSN 103 sends an MBMS De-Registration Request message to the GGSN 1042. The GGSN 1042 responds with an MBMS De-Registration Response message and removes the identifier of the SGSN 103 from the list of downstream nodes parameter in the MBMS Bearer Context. Step 13 is marked up by a dashed-line arrowhead in FIG. 3.

As is clear from FIG. 3, the MBMS Multicast Service Deactivation procedure is a signaling procedure between the UE 101 and the network. The deactivation procedure of the present invention removes the MBMS UE Context of a particular MBMS service from the UE 101, the SGSN 103, the RAN 102 and the GGSNs 104, 1042. The Multicast Service Deactivation procedure can be initiated by the UE 101, the GGSNs 104, 1042, the BM-SC 105 or the SGSN 103. All these cases are contained in the procedure illustrated in FIG. 3: the UE 101 starts to initiate the Deactivation procedure in step 1, the BM-MC 105 starts to initiate the Deactivation procedure in step 3, the GGSN 104, 1042 start to initiate the Deactivation procedure in step 4, and the SGSN 103 start to initiate the Deactivation procedure in steps 6 or 9.

Lastly, the present invention can also be carried out if the SGSN 103 in WCDMA communication systems or the RNC (not shown) in the RAN 102 as shown in FIG. 1 are replaced by the SGSN and the RNC of the present invention.

In addition to components of a conventional SGSN, the SGSN of the present invention further comprises:

means for requesting to de-link a user equipment of multimedia broadcast multicast service, for transmitting a de-link request message for user equipment of multimedia broadcast multicast service to a radio network controller of a radio access network, after said Serving GPRS Support Node completes context deactivation of user equipment of multimedia broadcast multicast service, so as to request that context deactivation of user equipment of multimedia broadcast multicast service be completed in said radio network controller, and for transmitting a de-link request message for user equipment of multimedia broadcast multicast service to said radio network controller, when an error occurs in processing of said multimedia broadcast multicast service by said wireless communication system, so as to request that context deactivation of user equipment of multimedia broadcast multicast service be completed in said radio network controller.

In addition to components of a conventional RNC, the RNC of the present invention further comprises:

means for responding to de-link a user equipment of multimedia broadcast multicast service, for instructing that context deactivation of user equipment of multimedia broadcast multicast be completed in said radio network controller, when a de-link request message for user equipment of multimedia broadcast multicast service is received from a Serving GPRS Support Node, and for transmitting a de-link response message for user equipment of multimedia broadcast multicast service to said Serving GPRS Support Node afterward, so as to report whether processing of context deactivation of user equipment of multimedia broadcast multicast service is successful or not in said radio network controller.

Having read the present specification, those of ordinary skill in the art can easily carry out the SGSN and the RNC of the present invention without any creative work.

Although the embodiments of the present invention have been described with reference to the accompanying drawings, various modifications or alterations can be made by those skilled in the art without departing from the scope defined by the claims as appended.

What is claimed is:

1. A method for use in a wireless communication system, said method comprising:
   in a Serving GPRS Support Node, completing deactivation of a Multimedia Broadcast Multicast Services (MBMS) User Equipment (UE) context associated with user equipment;
   said Serving GPRS Support Node transmitting to a radio access network a de-link request message regarding the user equipment leaving a multimedia broadcast multicast service, said de-link request message including at least a first identifier for identifying the multimedia broadcast multicast service, and a second identifier for identifying the user equipment,
   said de-link request message comprising a request for removing the MBMS UE context from a radio network controller in said radio access network;
   said Serving GPRS Support Node receiving from said radio access network a de- link response message which comprises an indication of whether said MBMS UE context has been successfully removed from said radio network controller in said radio access network, wherein said de-link request message further includes a third identifier for identifying an external packet data network and wherein said first identifier comprises an IP multicast address, said second identifier comprises an international mobile user identifier, and said third identifier comprises an access point name and wherein said UE MBMS context comprises UE-specific information related to a particular MBMS bearer service.

2. A method for use in a radio network controller in a wireless communication system, the method comprising:
   receiving, from a Serving GPRS Support Node, a de-link request message regarding user equipment leaving a multimedia broadcast multicast service, said de-link request message including at least a first identifier for identifying the multimedia broadcast multicast service, and a second identifier for identifying the user equipment;
   after receiving the de-link request message, removing a Multimedia Broadcast Multicast Services (MBMS) User Equipment (UE) context associated with the user equipment from said radio network controller;
   transmitting to said Serving GPRS Support Node a de-link response message of which comprises an indication of whether said corresponding MBMS UE context has been successfully removed, wherein said de-link request message further includes a third identifier for identifying an external packet data network and wherein said first identifier comprises an IP multicast address, said second identifier comprises an international mobile user identifier, and said third identifier comprises an access point name and wherein said UE MBMS context comprises UE-specific information related to a particular MBMS bearer service.

3. The method according to claim 2, wherein said specific condition is when an error occurs in processing of said multimedia broadcast multicast service by said wireless communication system.

4. A Serving GPRS Support Node, for supporting a multimedia broadcast multicast service in a wireless communication system, the Serving GPRS Support Node configured to:
   generate a de-link request message to de-link a user equipment having a multimedia broadcast multicast service;
   after said Serving GPRS Support Node completes deactivation of a multimedia broadcast multicast services (MBMS) user equipment (UE) context associated with the user equipment,
   transmit the de-link request message to a radio network controller when an error occurs in processing said multimedia broadcast multicast service by said wireless communication system, wherein said de-link request message comprises a request for completing deactivation of the MBMS UE context associated with the user equipment, thereby removing the MBMS UE context from said radio network controller, and wherein said de-link request message includes at least a first identifier for identifying the multimedia broadcast multicast service, and a second identifier for identifying the user equipment, wherein said de-link request message further includes a third identifier for identifying an external packet data network and wherein said first identifier comprises an IP multicast address, said second identifier comprises an international mobile user identifier, and said third identifier comprises an access point name and wherein said UE MBMS context comprises UE-specific information related to a particular MBMS bearer service.

5. A radio network controller, for supporting a multimedia broadcast multicast service in a wireless communication network, the radio network controller configured to:
   receive, from a Serving GPRS Support Node, a de-link request message regarding user equipment leaving a multimedia broadcast multicast service;
   after receiving the de-link request message, deactivate a multimedia broadcast multicast services (MBMS) user equipment (UE) context associated with the user equipment in said radio network controller, wherein said de-link request message includes at least a first identifier for identifying the multimedia broadcast multicast service, and a second identifier for identifying the user equipment and
   transmit a de-link response message to said Serving GPRS Support Node which comprises an indication of whether processing of the MBMS UE context deactivation in said radio network controller is successful, wherein said de-link request message further includes a third identifier for identifying an external packet data network and wherein said first identifier comprises an IP multicast address, said second identifier comprises an international mobile user identifier, and said third identifier comprises an access point name and wherein said UE MBMS context comprises UE-specific information related to a particular MBMS bearer service.

* * * * *